June 18, 1968   H. KELCH ET AL   3,388,859
TAXI METER

Filed March 17, 1967   3 Sheets-Sheet 1

Heinz Kelch
Siegfried Spauszus
INVENTORS
by Michael T. Anker

June 18, 1968  H. KELCH ET AL  3,388,859
TAXI METER
Filed March 17, 1967  3 Sheets-Sheet 2

June 18, 1968  H. KELCH ET AL  3,388,859

TAXI METER

Filed March 17, 1967  3 Sheets-Sheet 3

INVENTORS
Heinz Kelch
Siegfried Spanaus
by Michael S. Striker
Attorney

United States Patent Office 3,388,859
Patented June 18, 1968

3,388,859
TAXI METER
Heinz Kelch, Dattenbergstrasse 30, and Siegfried
Spauszus, Gorlitzerstrasse 10, both of Villingen,
Black Forest, Germany
Filed Mar. 17, 1967, Ser. No. 623,863
Claims priority, application Germany, Mar. 19, 1966,
K 58,776
19 Claims. (Cl. 235—30)

ABSTRACT OF THE DISCLOSURE

A taxi meter having electronic circuitry for generating two separate pulse train signals. One pulse train corresponds to a timing signal and comprises pulses occurring at equal intervals of time. In the other pulse train, the pulses are generated as a function of the distance traveled by the taxi and with a varying frequency depending upon the speed of the taxi. The electronic circuitry selects the faster one of the two pulse frequencies, and applies the selected pulse train to a counting and accumulator device which registers the pulses and indicates the fare. The taxi meter includes provision for modifying the electronic circuitry whereby the fare rate may be changed to different values.

Background of the invention

The computation of the fare based upon time and distance traveled, while the taxi is carrying a passenger, corresponds to officially determined units which form the fare increment. These fare increments do not, generally, correspond to the smallest monetary unit, but in most cases, they are integral multiples of it.

In taxi meters having multi-fare rates, the units of time and distance traveled can be adjusted to different values. Such changing from one fare rate to another is generally accomplished by manually actuating a switching knob. However, there are also taxi meters with automatic changing of fare rates, and wherein the change from one fare to another is performed automatically when a predetermined fare has been attained for a predetermined distance covered.

Since the distance parameter is derived from the transmission gears or wheels of the vehicle, it is necessary to adapt a taxi meter to varying scale factors, since not all vehicles have the same number of revolutions per meter of distance traveled.

An initial charge or basic amount is also charged for short rides in order to assure a minimum fare to the taxi owners. When the taxi meter is switched on, this basic amount is indicated on the fare register. For relatively long trips, this basic amount is credited to the normal fare on the basis of distance covered or passenger traveling time. This is accomplished by permitting a predetermined number of units of distance or time to elapse without advancing the fare register. In the current literature on this subject, this particular device is often referred to as the "initial distance device." This particular identification of the device is, however, incorrect, since the passenger has available through this basic amount both distance and time, and not only distance as the commonly used name would imply. In the following description, therefore, the basic amount refers to the amount which includes the parameters of both distance and time.

Aside from the zero setting of the register on which the fare to be paid by the passenger is indicated, the taxi meter is provided with several continuously registering control counters. These counters register the total mileage covered, the single fare amounts, the number of taxi meter starts, the occupied mileages, and the extras.

In the commonly known taxi meters, the master timing clock was already driven by electrical means. However, the timing parameter as well as the distance parameter were transmitted to the time and distance shaft, entirely through mechanical means.

In the U.S. Patent 3,157,352, a taxi meter is disclosed in which the distance as well as the time are processed in the form of electrical pulse trains, for purposes of computing the fare. In this arrangement, one pulse train is generated by means driven as a function of distance, and the other pulse train is generated by means which supplies pulses at constant frequency. The selection of the greater frequency of the two pulse trains, is accomplished by a comparator. The latter is provided with a rectifier circuit having input terminals to which the two pulse trains are applied through either L or C networks. Two solenoid windings are connected to the output terminals of the rectifier circuit. The solenoids are part of a stepping switch arrangement in which the stepping increment is produced by two half increments initialed by either one of the two coils. The disclosure also suggests that the output pulses of the rectifier circuit be amplified by means of a transistor amplifier. The pulses registered by the stepping switch arrangement, are converted, to rotary motion, and applied, through gearing, to the fare register as well as to the fare control counters.

The required basic amounts after which the fare register is advanced in increments, are entirely set through mechanical means in the form of speed reducers and gears. The total mileage control is also driven by electromechanical stepping switch means, directly connected with the pulse generator driven as a function of distance. The control counter which registers the passenger mileage is designed in the same manner as the counter which registers total mileage. The control counter, however, is connected to the distance pulse generator through a switch which is actuated by the starting knob of the taxi meter. Although the specification describing this taxi meter is called an all-electric taxi meter, the time and distance shaft only, with the usual two one-way clutches, was replaced through electronic circuitry. The mechanical adaptations for the different scale factors, as well as the mechanical gears for the predetermined fare rates including distance and time, were not eliminated.

It is doubtful, therefore, that any reduction in the cost of the taxi meter, which was the aim of the patent, was realized. Thus, the stepping switch arrangement in conjunction with the stepping motor as well as the pulse generators required to produce pulses having positive and negative half waves, will undoubtedly incur greater expense than the commonly known mechanical time and distance shaft. Furthermore, the two buffer capacitors 110 and 114, provided in the first embodiment of this patent, for purposes of energizing the solenoids 102 and 104, must be relatively large with respect to capacity as well as dimensions.

An additional disadvantage of the arrangement proposed in the patent, is that the pulse frequency must be kept relatively low. This arises from the condition that the inertia of the mechanical counters will not permit a higher pulse frequency since it will not be able to respond to it. Accordingly, the measured results will not be very precise. The construction of a multi-fare rate tax meter, in accordance with the principles suggested by the patent, is also very limited in nature. With instruments having four different fare rates, the lowest fare rate may differ from the highest by a factor of eight. If, now, as indicated in the patent specification, a maximum frequency of 40 cycles per second may be applied to the solenoids and to the stepping motors, a distance scale factor of 5 meters per pulse would be chosen for a maximum driving speed of 144 km. per hour or 40 m. per second. Under these conditions, the error may be up to 10% with regard to the smallest distance unit which can be 50 meters, for example, in the highest fare rate. The permissible tolerances, however, are within the limits of ±1%. The computation of these errors always refers to the first distance unit covered.

It is the object of the present invention to provide an electronic taxi meter construction which requires a minimum of mechanical parts in order to reduce wear and to realize the maximum possible operating life. The control counters have not been included in this basic consideration, since the substitution of these parts by fully electronic means would produce presently no advantages from the viewpoint of cost. For the same reason, the instant invention retains the mechanical arrangement for zeroing the fare register.

However, the adaptation of the apparatus to the different scale factors, the basic amount including the initial distance and time factors, any automatic changing of fare rates, and the computation of fare and applicable taxes, are all accomplished entirely through electronic means. A pulse train having a frequency as a function of the speed, serves as the reference base for the distance traveled. A pulse train of constant frequency, on the other hand, serves as the reference parameter for time.

An electronic transition circiut is provided for detecting which one of the two pulse trains has the higher frequency. The higher of the two frequencies is then applied, in accordance with the instant invention, to a multi-stage binary frequency dividing circuit. The latter provides an output pulse which, after amplification, is applied either directly or through other frequency dividing circuits, to a member which advances the fare register.

It is a further object of the present invention, to provide a transition circuit, as described supra, and consisting of a flip-flop and an AND gate controlled by this flip-flop. One pulse train is led to one side of the flip-flop as well as to the output. The other pulse train is led to the other side of the flip-flop and also to the output via the AND gate controlled by this particular side of the flip-flop.

By setting, in a predetermined manner, the initial states of the individual flip-flop states of the first frequency dividing circuit, the required basic amount is established. This presetting of the flip-flop stages is accomplished by momentarily supplying a definite potential to these circuits. At the same time, the units of distance as well as time which are accumulated onto the basic amount, through the fare register, are established by feeding back the output pulses of the first frequency dividing circuit to predetermined flip-flop stages within the latter.

The binary frequency devices which are used, are well known in the art and described in the section "binary coded decimal counters" in the "Handbook of Data Processing" by K. Steinbuch, on pages 554 and 555. The commonly known mechanical time and distance shaft having two one-way clutches, one of which is driven by time and the other by distance, and which transmits only the faster of the two driving motions, is replaced by the transition circuit, in accordance with the present invention. This transition circuit comprises substantially a flip-flop with two pulse inputs and one gate.

Description of the preferred embodiments

Figure 1:
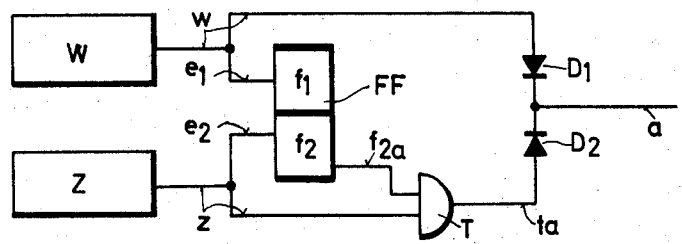
FIG. 1 is an electrical schematic diagram and shows the arrangement of the transition circuit in accordance with the present invention.

The circuit shown in FIG. 1, designated as the transition circuit, is the electronic equivalent of the time and distance shaft that was normally used. In conventional apparatus, it is the task of this mechanical time and distance shaft to transfer, to the fare indicating drum or counter the faster of the two rotary movements: time drive and distance drive. In a similar manner the transition circuit must determine which of the two pulse sequences should be transferred to the fare indicator or counter. The problem is complicated by the condition that the two-pulse sequence may have different pulse repetition rates.

The generating of the two pulse trains or sequences is accomplished in a different manner for each train or sequence. To generate the timing pulses or clock pulses having a constant pulse repetition frequency, an astable multivibrator circuit is used. The distance pulses, on the other hand, have a pulse repetition frequency which varies with the speed of the vehicle. These pulses, depending upon the distance traveled, can be generated by a light-barrier with an apertured disk $2'$ driven as a function of distance and speed. The same result may be achieved through a magnetic drum having stored bits of information. The magnetic drum is rotated as a function of distance traveled, and the bits are read out by a reading head, in the form of pulses, and transferred to the transition circuit for processing.

The transition circuit, in accordance with FIG. 1, comprises essentially a flip-flop FF and a gate circuit T. Pulses as a function of distance, generated by the distance pulse generator W, are transmitted to the output $a$ via the line $w$ and diode $D_1$. At the same time, these distance pulses are transmitted to the side $f_1$ of the flip-flop FF, via the input line $e_1$. The timing pulses, generated by a master clock Z, are lead to the other side $f_2$ of the flip-flop, by way of the line $e_2$. These timing pulses are also transmitted directly to the gate T which transmits to the output $a$, by way of the line $ta$ and diode $D_2$.

Figure 2:
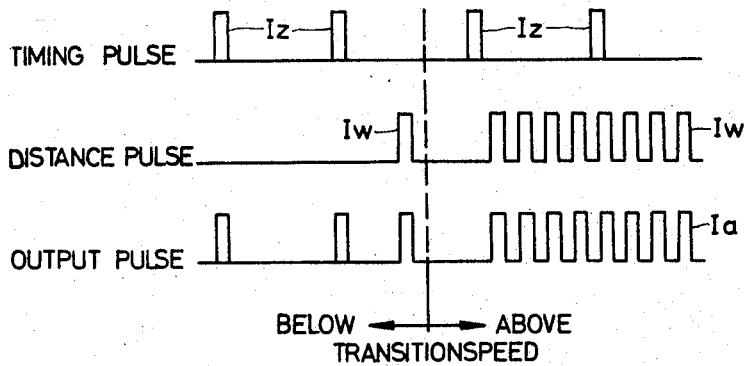
FIG. 2 is a pulse diagram of the signals processed by the transition circuit of FIG. 1.

The functional operation of the transition circuit is best described in relation to the pulse diagram shown in FIG. 2. At the top line of the pulse diagram, the timing pulses $I_z$ appear at equal intervals. The distance pulses $I_w$, on the other hand, occur at varying time intervals on the second line of the pulse diagram. The third line of the pulse diagram, in FIG. 2, shows the sequence of pulses $I_a$ appearing at the output of the transition circuit.

The circuit arrangement is based on the condition that the distance pulses $I_w$ may all be transmitted from the output, provided that the timing pulses which occur individually between two consecutive distance pulses, are suppressed. It is also a condition of the circuit arrangement that one timing pulse is suppressed or inhibited for each distance pulse arriving while the frequency of timing pulses is greater than that of the distance pulses. The inhibiting or suppression of the timing pulses $I_z$, so that they are not counted or registered, is accomplished in the following manner:

A timing pulse $I_z$ can only pass the gate circuit T, provided that the side $f_2$ of the flip-flop FF is conducting. Each distance pulse $I_w$ transfers the flip-flop FF to the side $f_1$. The first timing pulse $I_z$, arriving after a distance pulse $I_w$, transfers the flip-flop FF to the side $f_2$, so that the latter becomes conducting. If now, one or more timing pulses $I_z$ are applied to the side $f_2$ and to the gate T, before the appearance of the next distance pulse $I_w$, these timing pulses can be transmitted by the gate T and to the output $a$. The next distance pulse $I_w$, is transmitted to the output $a$ directly by way of diode $D_1$, as well as to the side $f_1$ of the flip-flop FF. In this manner, the gate is again cut off with regard to the next timing pulse. Only the timing pulse after that will be transmitted, provided that it appears prior to the next distance pulse $I_w$. Through this arrangement therefore a pulse train on the third line of FIG. 2 is generated. However, a slight error still remains within the arrangement, because one timing pulse is not counted or registered. This is the first pulse applied to the transition circuit below the transition speed. The latter is defined as the driving speed of the vehicle below which only the timing pulses $I_z$ should be taken into consideration for purposes of computing the fare at the speeds of the vehicle, the timing pulse repetition frequency being greater than that of the distance pulses. This slight error, however, may be neglected because under normal conditions a large number of distance pulses are accumulated, and therefore the loss of one timing pulse in relation to such a large number of distance pulses, may be disregarded. While it may appear possible to interchange the distance pulse generator W with the master clock Z, in the arrangement of FIG. 1, the preceding error may attain uncontrollable magnitudes, under certain conditions.

Figure 3:
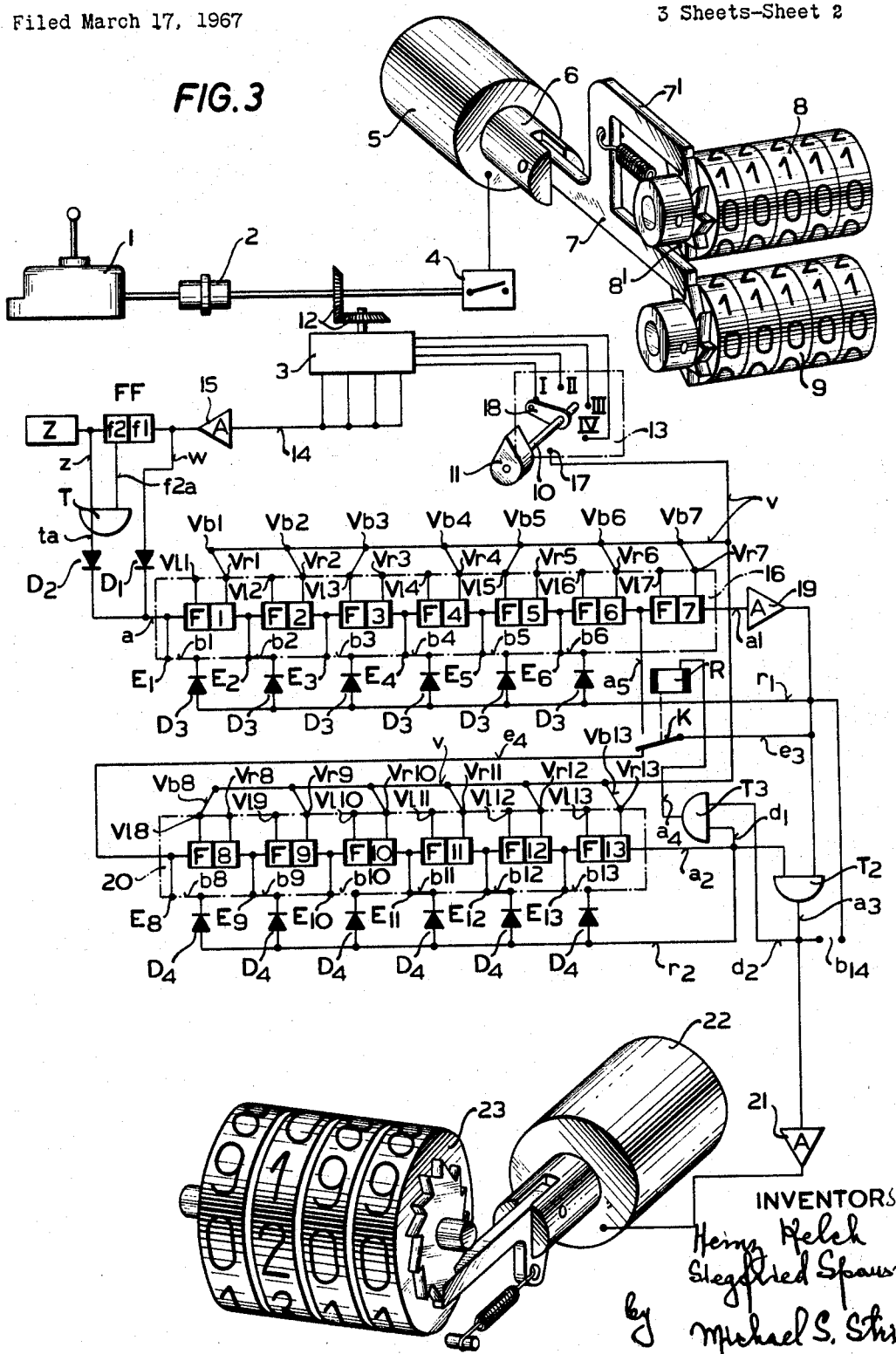
FIG. 3 is a functional schematic diagram of a taxi meter capable of four different fare rates and generating the distance pulses through a light barrier disk having four rows of holes for determining the basic amount; automatic switching to the double fare rate being realized through electronic means.

In the taxi meter embodiment, of FIG. 3, the rotary motion from the gear box 1 is transmitted to a distance pulse generator 3, as well as to a contacting member 4. An intermediate gearing arrangement 2 serves to transmit the mechanical rotary motion from the gear box 1. As a result of its action, the contacting member 4 produces a train of pulses as it is actuated, and these pulses, being a function of distance, are transmitted to an electromagnet 5. The latter in the form of a solenoid having an armature 6, causes the counter 8 to advance with each pulse. This is mechanically accomplished through the link 7 which also actuates a counter 9. The counters 8 and 9 are designated as the passenger mileage and total mileage respectively.

When the taxi meter is not operating, implying that the vehicle is not carrying a passenger, the upper finger 7', of the link 7, is moved out of the range of motion of the escapement wheel 8'. In this manner, the counter or fare register 8 is not actuated under this condition. The disengagement of the finger 7' with the ratchet wheel 8' may be accomplished entirely through mechanical means or through electromechanical means with the aid of the switching control knob 11 secured to the shaft 10 so as to turn the armature 6 together with the fingers 7 and 7' in anti-clockwise direction for about ten degrees of angle. In this way, the finger 7' leaves the ratchet wheel 8' while the finger 7 remains engaged with the ratchet wheel of counter 9. The intermediate gear 2 is designed to provide the proper scaling factors so that the instrumentation is properly adapted to the speed of the gear box. For example, the intermediate gear arrangement 2 may serve as a speed reduction unit and be designed so that the contacting member 4 transmits a pulse for every 100 meters of distance traveled.

Figure 2A:
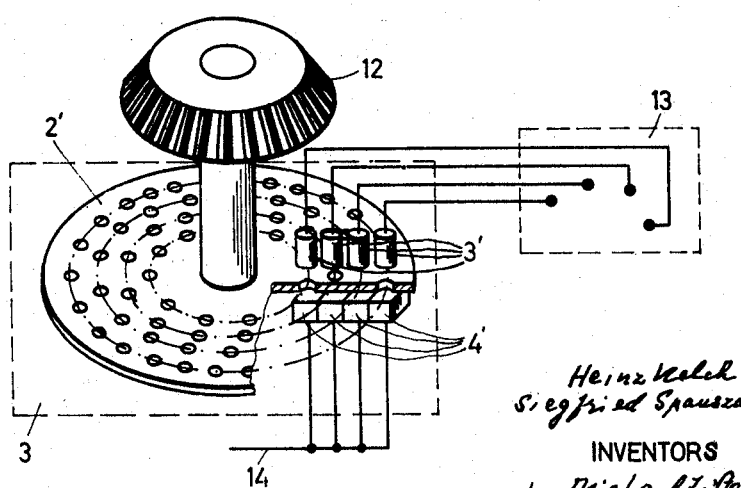

The distance pulse generator 3 is designed in the form of an optical system having an apertured disk comprising four hole circles. This optical system is schematically shown in detail in FIG. 2a, as it is in common use. The apertured disk 2' is driven by the intermediate gear 2, through the bevel gears 12. The different hole circles on the apertured disk 2' have different numbers of holes or openings and separate light barriers each of which consisting of a light source 3' and a photoelectric cell 4' assigned to them. These can be switched into operation, individually by means of the switching arrangement 13 carried on the shaft 10. The arrangement corresponds to a four-tariff or a four-fare system which can be switched to any one of four different distance scales.

The distance pulse generator 3 has four outputs connected commonly to the line 14. By way of the amplifier and pulse shaper 15, the pulses appearing on line 14 are transmitted to the flip-flop FF, and to the line designated $a$. The transition circuit including the flop-flop FF, shown in FIG. 3, corresponds to that described in relation to FIG. 1.

The pulses appearing on line $a$, of the transition circuit, are applied to a frequency dividing circuit 16 having seven binary stages. Each of these seven stages F1 to F7 comprises a flip-flop. The stages are interconnected to form a counter having a capacity of 128 ($2^7$). By preselecting the initial state of each of the flip-flops of the counter, it is possible to determine at what pulse count, the counter will provide an output pulse.

In order to establish the initial states of the individual flip-flops F1 to F7, each flip-flop circuit is provided with two terminals $Vl1$ to $Vl7$ and $Vr1$ to $Vr7$. The left side of each flip-flop is assigned to the terminal $Vl$, and the right side of each flip-flop is assigned to the terminal $Vr1$ to $Vr7$. By connecting either the terminals $Vl$ or $Vr$ to the pole 17 within the switch arrangement 13, by way of the terminal $Vl$ to $Vr7$ and line $v$, the individual flip-flops may be set to a particular predetermined state. The necessary potential to the terminal 17, is applied by the contact arm 18 as it connects momentarily to the terminal 17 on its way to one of the fare rate positions I to IV, from the position that it resides in when the taxi is unoccupied. The states of the individual flip-flop circuits are then altered during operation.

Aside from the presetting terminals $Vl1$ to $Vl7$, the left sides of the individual flip-flop circuits F1 to F6 are provided with feedback terminals E1 to E6. These feedback terminals E1 to E6 can be connected to the output line $a_1$, of the frequency dividing device 16, by way of the diodes $D_3$. A pulse transformer 19 is provided in order to shape the pulses and to furnish them with the desired amplitude. The common feedback line $r_1$ connects the output line $a_1$ with the diodes $D_3$. The output line $a_1$ is connected to a gate $T_2$ as well as to a switching contact K, via the line $e_3$. The switching contact K connects the output lines $a_1$ to a second frequency dividing circuit 20, through means of the line $e_4$.

The design of the frequency dividing circuit 20 is precisely identical to the circuit 16, with the exception that it has only six flip-flop stages F8 to F13, instead of seven. The circuit 20 is also provided with three selection terminals $Vl8$ to $Vr13$, as well as feedback terminals E8 to E13. The preselection of presetting terminals $Vl8$ to $Vr13$ can also be connected to the line $v$, as desired, similar to that described for the corresponding terminals of the circuit 16. The output from line $a_2$ is fed back to the circuit 20, by way of the feedback line $r_2$. An output line $a_2$ is also connected to the gate $T_2$. The output line $a_3$, of the latter, is connected to a solenoid 22, by way of a pulse amplifier 21. The solenoid 22 serves to advance the fare register 23.

By way of the path $d_1$, the output $a_2$, of the frequency dividing circuit 20, is applied to an AND gate $T_3$. The output line $a_3$ of the gate $T_2$ is similarly connected to the gate $T_3$, via the path $d_2$. The output $a_4$ of the AND gate $T_3$ is applied to a relay coil R, which when energized actuates the contact K. When the later is actuated, in this manner, the line $a_5$ is connected to the output of the flip-flop F6, of the frequency dividing circuit 16.

In a special case, to be described, another bridge arrangement $b_{14}$ is provided which, when closed, establishes a direct connection between the output line $a_1$ and the line $a_3$. Under these conditions, the gate $T_2$ is short-circuited. The number of flip-flops within either the frequency dividing circuit 16 or 20, as well as the numbers of holes in the apertured disk 2' of the distance pulse generator 3 and the number of revolutions per unit distance, is a function of the required measuring tolerances and the individual increments assigned to the fare register. The functional operation of the arrangement of the gear 3, may be explained through the following practical example: Assume that:

Fare rate—

| | Corresponds to a distance of, meters |
|---|---|
| 1 | 150 |
| 2 | 114 |
| 3 | 85 |
| 4 | 50 |

By designating that one revolution of the apertured disk 2' is to correspond to 50 meters of distance traveled, the apertured disk 2', of the distance pulse generator 3, is arranged as follows:

The hole circle corresponding to fare rate—

| | Has, holes |
|---|---|
| 1 | 42 |
| 2 | 55 |
| 3 | 74 |
| 4 | 126 |

The number of holes (55) in the hole circle for the fare rate 2 does not correspond precisely to a distance of 114 meters. It does, correspond to a distance of 114.5 meters. Furthermore, the hole circle associated with fare rate 3 does not provide the 85 meters precisely. Thus a value of 85.1 meters is obtained instead of 85 meters. These differences are, however, within permissible tolerances. Therefore it is not feasible from the economical viewpoint to increase the number of flip-flop stages in the binary frequency dividing circuit 16. Since, in these cases, two pulses are missing for each counting cycle of the frequency dividing circuit 16, the counting capacity of the circuit 16 is reduced by two pulses, with the feedback bridge $b_2$ closed. The implication of the arrangement is that the 126th pulse of each counting cycle is also an output signal from the circuit 16.

The timing unit for the taxi meter, for fare rates 1 to 4, is assumed to be one minute, and therefore the master clock Z must generate 126 pulses per minute. For the timing and distance units of the individual fare rates, thus determined, four different transition speeds result. These are 9 kilometers per hour for fare rate 1, 6.9 kilometers per hour for fare rate 2, 5.1 kilometers per hour for fare rate 3, and 3 kilometers per hour for fare rate 4.

In order to set the basic fare rate, the initial state of the individual flip-flops of the two frequency dividing circuits 16 and 20, is determined. Taxi meter specialists usually specify the basic fare rate as a function of the distance and timing units. In the presently assumed example, this basic amount for fare rate 1 would be a distance of 325 meters equal to 2⅙ of 150 meters. This basic amount is subdivided into integers and fractions. The latter are computed and registered by the binary frequency dividing circuit 16, while the integers are registered and computed by the circuit 20.

Since the distance unit is 150 meters and since 126 pulses are produced for these 150 meters, 21 pulses (⅙ of 150) result for the 25 meters amount. This implies that the initial capacity of the counting device 16 must be limited to 21 pulses. Accordingly, the counter must be set so that a 128 minus 21 or 107 pulses are suppressed. In binary langauge, 107 equals the sum of 64+32+8+2+1. Therefore, the following presetting terminals must be connected to the presetting line $b$: V$r$1, V$r$2, V$l$3, V$r$4, V$l$5, V$r$6, and V$r$7. When the distance of 25 meters has been covered, or a corresponding time interval has elapsed, the 21st input pulse to the circuit 16, becomes simultaneously an output pulse. This output pulse is led to the input of the binary circuit 20, via the output line $a_1$, the line $e_3$, contact K, and the line $e_4$. When the 21st pulse passes the binary circuit 16, all flip-flops F1 to F7 have been transferred to their left sides, so that the initially set state, determined by the presetting terminals, is cancelled.

The first output pole is, however, also led to the flip-flops, of the circuit 16, and transfers these again to their right side. The output pulse is routed by the feedback line $r_1$, the diode $D_3$, and the feedback bridge $b_2$. Accordingly, the initial state for the first whole distance unit is set. Before the first switching pulse reaches the solenoid 22, the distance unit of 150 meters must again be covered twice. This implies that the circuit 16 must still supply two output pulses to the circuit 20. Due to the capacity of 126 pulses resulting from the feedback bridge $b_2$, the next output pulse will appear at the output of the circuit 16, after another 126 input pulses.

Due to the assumed basic amount of 325 meters, or a corresponding time interval, the first switching pulse which energizes the solenoid 22 and, consequently, advances the fare register 23 by one increment, may only be transmitted by the gate $T_2$, when after the first 25 meters another 300 meters have been covered. The distance unit of 150 meters in fare rate 1, is contained twice within these remaining 300 meters. Accordingly, another two output pulses from the circuit 16 must be applied to the input of the circuit 20, before the gate $T_2$ will transmit. It is, therefore, necessary to reduce the counting capacity of the flip-flop circuits F8 to F13, of the circuit 20, to "3." This is accomplished by connecting the corresponding presetting terminals V$l$8 to V$r$13, to the presetting line $v$. The initial presetting capacity of the latter is $2^6 = 64$. The following presetting terminals must therefore be connected to the presetting line $v$:

V$r$8, V$l$9, V$r$10, V$r$11, V$r$12, and V$r$13

With this arrangement, the third output pulse of the circuit 16 becomes, at the same time, the output pulse of the circuit 20, and, therefore, the gating pulse of the gate $T_2$. The third output pulse passes the gate $T_2$ and is, at the same time, the first switching pulse which energizes the solenoid 22.

The gate $T_2$ has the characteristic that it transmits with the first output pulse from the binary circuit 20, and then remains in the open state until the taxi meter is set to zero. In this manner, all subsequent output pulses of the circuit 16, may pass the gate and act as switching pulses for actuating the solenoid 22.

The preceding description corresponds to an arrangement wherein a taxi meter has four fare rates with a basic rate equivalent to 2⅙ distance units. The distance units of the individual fare rates are 150, 114, 85, and 50 meters.

With the feedback bridges $b_8$ to $b_{13}$ of the circuit 20, the gate $T_3$, the switching relay with contact K, the additional output line $a_5$, and the two input lines $d_1$ and $d_2$ of the AND gate $T_3$, the taxi meter can be provided with an automatic double-fare rate change-over device. For such an arrangement, however, it is essential that the gate $T_2$ should not function in the preceding manner wherein the first pulse opening the gate can also be transmitted by it. In this new arrangement, it is essential that the gate be opened only by the pulses arriving simultaneously on the lines $a_1$ and $a_2$, and that only the subsequent pulses appearing on the line $a_1$ be transmitted or passed. The reason for this will be described.

As a result of this desired difference in the functioning of the gate $T_2$, the initial capacity of the frequency dividing circuit 20 must be reduced by one pulse. In this manner, the second pulse, and not the third pulse, as previously described, becomes at the same time the output pulse of the binary circuit 20. Assurance is obtained, thereby, that the third output pulse of the circuit 16 can again be transmitted by the gate $T_2$, and thus become an actuating pulse for the solenoid 22.

This modified design for the gate $T_2$ is necessary, since precautions must be taken that the gate $T_3$ become not already open after the elapse of the basic amount. This would be the case when the two gate pulses arriving at $T_2$ from the lines $a_1$ and $a_2$ would be, at the same time, transmitted for actuating the solenoid 22. The feedback line $r_2$ with diodes $D_4$, and the feedback bridges $b_8$ to $b_{13}$, serve the purpose of setting the distance beyond which the double fare rate should become effective. If, for example, the change-over to the double fare rate should take place after a distance of 6 km., then the gate $T_3$ must be opened after 40 distance units have been covered. One distance unit in fare rate 1 equals 150 meters—in order to energize the relay R and thereby switch the contact K to the output line $a_5$. After the first counting cycle of the circuit 20, performed during the elapse of the basic amount, the binary circuit 20 would possess its entire capacity of $2^6=64$. Since, however, the circuit 20 must deliver its next output pulse after another 40 additional distances, implying after another 40 output pulses of the binary circuit 16, its capacity must be reduced by 24 (16+8). This requires that the feedback bridges $b_{11}$ of the flip-flop 11, and $b_{12}$ of the fifth stage or flip-flop 12, be closed.

In operation, assume that the taxi driver switches the taxi meter by turning the control switching knob 11 to fare rate 1. The contact arm 18 of the switching arrangement 13 is, accordingly, positioned on the pole I. Under this condition, the light barrier with the hole circle of 42 holes, of the pulse generator 3, is switched in.

When the taxi meter is actuated, the switching arm 7' associated with the counter or register 8, is brought into engagement with the ratchet wheel 8', and the presetting line $v$. In this example, with automatic change-over to double fare rate, therefore, the states of the individual flip-flop stages, of the circuits 16 and 20 are as follows:

In the binary reduction device 16,
F1 is right-hand conducting
F2 is right-hand conducting
F3 is left-hand conducting
F4 is right-hand conducting
F5 is left-hand conducting
F6 is right-hand conducting
F7 is right-hand conducting.

In the circuit 20, the stage F8 is left-hand conducting and the stages F9 to F13 are all right-hand conducting. On the fare register 23, of the taxi meter, the basic rate of, for example, DM2, is indicated.

When the vehicle begins to drive, the output shaft of the reduction gear 2 turns once per 100 meters of distance traveled, while the apertured disk turns twice per 100 meters. The bevel gears 12 have a gear ratio of 1:2. After each 100 meters of distance, the solenoid 5 receives a pulse. In this manner, the counters 8 and 9 are advanced by one step for each 100 meters. When the transition speed is exceeded, pulses are applied to the circuit 16, from the transition circuit, by the amount of 42 pulses per 50 meters or 126 pulses after 150 meters of distance covered.

The function of the individual flip-flop stages of the circuits 16 and 20 is such that the applied pulses transfer them to the right side, when the respective stages are left-hand conductive. In the event that any particular stage is already set to the right-hand, the applied pulse will flip the stage to the left and simultaneously pass onto the next stage.

When the two frequency dividing circuits are set to their initial stage or initial capacities, the 21st pulse in fare rate 1 and after the first 25 meters of distance, will appear in the output pulse of the circuit 16. This output pulse appearing in line $a_1$ will be led to the circuit 20 as an input pulse. At the same time, however, this first output pulse will appear again at the second stage F2, of the circuit 16, via the feedback line $r_1$, the corresponding diode $D_3$, and the closed feedback bridge $b_2$. Therefore, as in the second counting cycle, the 126th input pulse of the circuit 16 becomes, at the same time, an output pulse. Since the counting capacity of the circuit 20 was reduced to two pulses, due to the presetting action, an output pulse will appear at the circuit 20, after the second counting cycle of the circuit 16. This output pulse, however, will be guided to the gate $T_2$ by the output line Since this output pulse of the binary circuit 20 appears at the same time, also on the line $a_1$, as an output pulse of the binary circuit 16, the gate $T_2$ is opened for the subsequently following pulses. The output pulse appearing at the circuit 16, after the third counting cycle, can then pass the gate $T_2$ and energize the solenoid 22. After this third counting cycle, the basic amount has elapsed, implying that $1 \times 25$ meters$+2 \times 150$ meters$=325$ meters have been covered. As a result, $21+2 \times 126=273$ pulses have been counted. The latter may also correspond to a passenger carrying time interval of 2.16 minutes. After this, the circuit 20 has taken over its second task, namely to count the number of distance units, and the double fare rate should then be automatically switched in. In the present circuit, this is the instant in which gate $T_3$ should be opened and relay R should be energized.

With the assumed value of 6 km.$=40$ distance units of 150 meters (fare rate 1), the counting capacity of the circuit 20 was reduced from 64 to 40 pulses by closing the feedback bridges $b_{11}$ and $b_{12}$. In this manner, the 40th input pulse at the circuit 20, is at the same time the second output pulse of this circuit. This output pulse on the line $a_2$ and the actuating pulse on the line $a_3$, led over line $d_2$ of the gate $T_3$ from the line $a_1$, now passes the gate $T_3$ and is applied to relay R. This relay is thus energized and reverses the contact K to the output line $a_5$ so as to short-circuit the last stage F7 of the circuit 16. The counting capacity of the circuit 16 is thus reduced to one-half, implying that the distance unit is now only 75 meters instead of 150 meters. Accordingly, at each counting cycle, at the circuit 16, the 63rd input pulse always becomes, at the same time, the output pulse. The latter therefore becomes the actuating pulse for the solenoid 22.

Assuming that another fare rate, other than fare rate 1, is switched in, and the taxi meter is started, the distance unit is reduced to the values 114.5 meters for fare rate 2, 85.1 meters for fare rate 3, and 50 meters for fare rate 4. These values correspond to the hypothesis of the assumed example. At the same time, the basic amount and the double fare rate distance, after the lapse of which the double fare rate is switched in, are reduced in the same relationship. When, for example, the fare rate 2 is switched in, the basic amount of 325 meters would be reduced by the quotient 150 m.:114.5 m., to 248.08 m. The distance of 325 m., as the basic amount, corresponds in fare rate 1, to a time interval of 195 seconds ($3.25 \times 1$ minute). In fare rate 2, this time of 195 seconds would be reduced to 148.85 seconds in the ratio of 150:114.5. For fare rate 3, there would be a reduction in the ratio 150:85.1, and for fare rate 4, in the ratio of 150:50. Correspondingly, the double fare rate distance unit for fare rate 2, is reduced from 6 km. to 4.58 km.

In the event that the basic amount, measured in meters of distance covered, should be, for example, the distance unit of 150 m. of fare rate 2 or 214.5 m., the gate $T_2$ can be short-circuited by closing the bridge $b_{14}$. In this case, the circuit 16 must be preset to correspond to the given distance of 150 meters. Thus, its capacity must be reduced by two pulses to 126, and the following presetting terminals are connected to the presetting line $v$: $Vl1$, $Vr2$, $Vl3$, $Vl4$, $Vl5$, $Vl6$, and $Vl7$.

With regard to the double fare rate indicated above, the binary circuit 20 is set to an initial capacity of one pulse. The presetting terminals $Vr8$, $Vr9$, $Vr10$, $Vr11$, $Vr12$, and $Vr13$ are thus connected to the presetting line $v$. Upon the arrival of the first output pulse, on the circuit 16, which at the same time, is an output pulse of the circuit 20, the gate $T_2$ is opened. Due to the set feedback $v_2$ at the circuit 16, and $b_{10}$ at the circuit 20, the same counting capacities, as in the above example, are again set.

Instead of indicating the fare by means of mechanical counters 23, it is equally possible to provide electronic indication through means of digital indicator tubes. For such a design, however, an additional device would be required which counts and stores the switching pulses of the binary circuit 16, and displays them, at the same time, on the digital computer tubes. If, particularly, the indicating part and the computer part of the taxi meter is arranged separate from each other, in the vehicle, fare indication by such electronic means is especially advantageous. The basic rate should then be set in the storage device as a constant.

In comparison with the mechanical fare indicating counters, an electronic device has the advantage that it can be reset to zero or to its basic rate, much more readily. Thus, while the resetting of the mechanical counters, usually provided in a taxi meter, always requires a substantial number of parts, and above all space, the resetting means for an electronic indicating device may consist of a simple electrical contact within the switching arrangement 13 and mounted upon the switching shaft 10.

When the fare rate has to be altered, the apertured disk 2' in the distance pulse generator 3 must be rearranged. Furthermore, other presetting and feedback settings must be established with respect to the circuits 16 and 20. Assume for example that the new fare rate steps should cover the following distance units:

| Fare rate: | Meters |
|---|---|
| 1 | 200 |
| 2 | 160 |
| 3 | 128 |
| 4 | 100 |

Then the following hole circles on the apertured disk are required:
For fare rate 1; hole circle 1; 32 holes
For fare rate 2; hole circle 2; 40 holes
For fare rate 3; hole circle 3; 50 holes
For fare rate 4; hole circle 4; 64 holes.

At the predetermined scale of the apertured disk of one revolution per 50 meters, a counting capacity of 128 pulses per cycle is obtained at the circuit 16

$(200:50 \times 32 = 128, \ 160:50 \times 40 = 128$
$128:50 \times 50 = 128, \ 100:50 \times 64 = 128)$ Thus, the previously closed feedback bridge $b_2$ would have to be reopened and the other feedback bridges $b_1$ to $b_6$ would also have to remain open.

If the basic amount is now changed to 400 meters, in which the distance unit of fare rate 1 is contained exactly twice, the presetting terminals $Vl1$, $Vl2$, $Vl3$, $Vl4$, $Vl5$, $Vl6$, and $Vl7$ would also have to be connected to the presetting line $v$. Accordingly, under these conditions, the whole counting capacity of the circuit 16 is also available. Since the distance unit of 200 meters, of fare rate 1, is contained exactly twice in the basic amount of 400 meters, the circuit 20 must be preset so that the first output pulse of the circuit 16 becomes at the same time, the first input and output pulse at the circuit 20. In this manner, the gate $T_2$ becomes conducting. Therefore, the counting capacity of the circuit 20 must be reduced to one pulse, and hence the presetting of all stages must be to the right hand. Thus the presetting terminals $Vr8$, $Vr9$, $Vr10$, $Vr11$, $Vr12$, and $Vr13$ must be connected to the presetting line $v$.

If the distance of 6 km. is maintained, after which the double fare should be switched in, the following modifications to the feedback bridges $b_9$ to $b_{13}$ of the circuit 20 result:

The distance unit of 200 meters, of fare rate 1, is contained 30 times in 6 km. Thus, after 30 count cycles or after 30 switchings, the relay R should be energized by way of the gate $T_3$. The capacity of the circuit 20 must, therefore, be reduced from $2^8=64$ to 30. By closing the bridges $b_9$ and $b_{12}$, the capacity of the circuit 20 is reduced by 34 from 60.

In order to make it unnecessary for the service staff which sets up the taxi meter for varying rate changes, to perform calculations, data tables may be provided. Such data tables could show the number of holes of the apertured disk to be set, as well as the feedback bridges $b_1$ to $b_8$, which have to be closed, and the presetting switches $Vb_1$ to $Vb_{13}$, in order to obtain a desired fare rate.

To make it unnecessary to introduce additional electrical components when instituting a particular fare rate, the diodes $D_3$ and $D_4$ are always present and installed. This is the case even when they are not necessary for actually carrying out a particularly desired fare rate.

Figure 4:
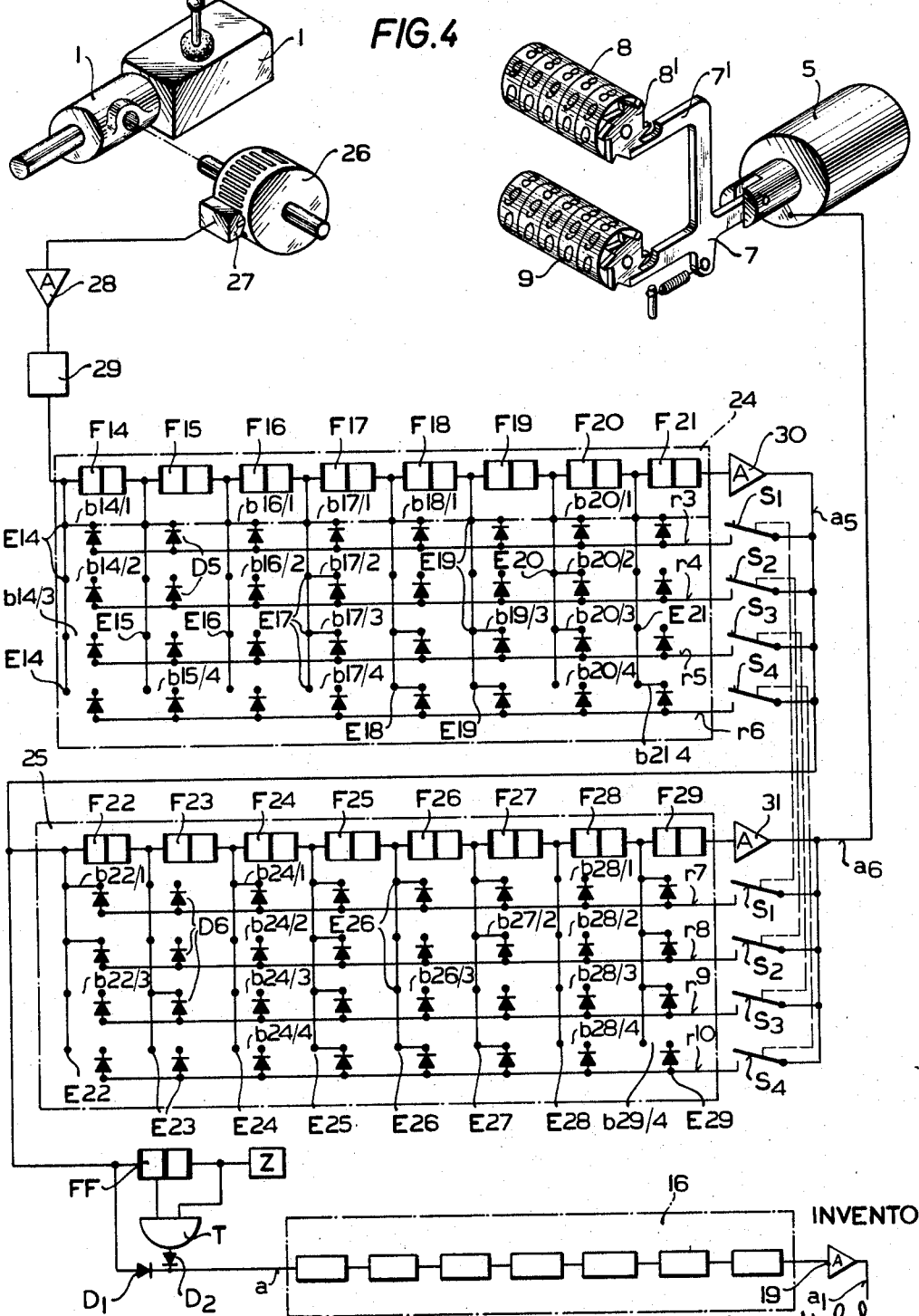
FIG. 4 is a functional schematic diagram of a taxi meter having a four-fare rate capability with electronic means for adapting the apparatus to varying scale factors, the computation of the basic amount and the double fare rate being performed electronically and by means of one and the same binary frequency dividing circuit.

To avoid the requirement of having to interchange the apertured disk, when instituting a fare rate change, and to make it unnecessary to adapt the gearing to the rotational rate of the contacting member 4 actuating the mileage control counter, an additional frequency dividing circuit 24 is provided, in a second embodiment, as shown in FIG. 4. Another frequency dividing device 25 is connected in series with the unit 24 to generate the 100 meter pulses for the mileage control counters 8 and 9.

The distance pulse generator, in FIG. 4, comprises a magnetic drum 26 in conjunction with a reading head 27. The magnetic drum 26 is driven directly by the output of the gear box. The magnetic drum stores a specific number of bits about its periphery, and these bits, when passing the reading head 27, each generate a pulse. These distance pulses are transmitted from the reading head 27 to the frequency dividing circuit 24 by way of the amplifier 28 and pulse shaper 29. The circuit 24 comprises eight flip-flop circuits F14 through F21. The output pulses of the circuit 24 are transmitted, by amplifier 30 and line $a_5$, to the input of circuit 25, as well as the transition circuit comprised of flip-flop FF, gate T, diodes $D_1$ and $D_2$, and master clock Z.

The amplifier 31 applies the output pulses of the circuit 25, to the solenoid 5, via line $a_6$, for the purpose of advancing the counters or registers 8 and 9. The smallest unit of these mileage counters 8 and 9 is 100 meters. The two frequency dividing circuits 24 and 25 have each 4 feedback lines assigned to them, respectively, with the designation $r_3$, $r_4$, $r_5$, $r_6$, and $r_7$, $r_8$, $r_9$, $r_{10}$. By means of the switches S1, S2, S3 and S4, these feedback lines can be connected in pairs with the output lines $a_5$ and $a_6$, so that $r_3$ and $r_7$, $r_4$ and $r_8$, $r_5$ and $r_9$, $r_6$ and $r_{10}$, are simultaneously applied to the lines $a_5$ and $a_6$, respectively. Through the bridges $b_{14/1}$ through $b_{21/4}$, the feedback terminals E14 through E21 can be connected, via diodes $D_5$, with the individual feedback lines $r_3$, $r_4$, $r_5$ and $r_6$. At the circuit 25, the feedback terminals E22 to E29 can also be connected, via diodes $D_6$, with the individual feedback lines $r_7$, $r_8$, $r_9$ and $r_{10}$, by means of the bridges $b_{22/1}$ through $b_{29/4}$. The feedback lines $r_3$ through $r_{10}$ perform the same function as the feedback lines $r_1$ and $r_2$ in the embodiment of FIG. 3. These feedback lines serve to reduce the counting capacities of the frequency dividing circuits 24 and 25, to the desired predetermined values. The switches S1, S2, S3, and S4 permit the setting of the different fare rates. The embodiment of FIG. 4 also illustrates a taxi meter having four possible fare rates.

The transition circuit, and the embodiment of FIG. 4, comprising the flip-flop FF, the gate T, and the diodes $D_1$ and $D_2$, is connected to the frequency dividing circuit 20, similar to that shown in the embodiment of FIG. 3. The basic amount as well as the changing over to the double fare rate system, are set in the same manner as described in relation to the first embodiment.

For the purpose of describing the functional operation of the embodiment of FIG. 4, the same operating values prevailing for the embodiment of FIG. 3, are assumed:

| Fare rate: | Distance unit, meters |
|---|---|
| 1 | 150 |
| 2 | 115 |
| 3 | 85 |
| 4 | 50 |

With respect to the rotational quantities which have to be handled, the number of bits under magnetic drum 26 have been empirically determined for the range between 0.4 revolution per meter and 1.28 revolutions per meter. At the present time, the number of such bits under magnetic drum is assumed as 160. The counting capacities of the circuit 24, for the different fare rates, as well as their distance units, are also determined empirically. In conjunction with the present example, the following capacities have been established:

| Fare rate: | Pulses |
|---|---|
| 1 | 240 |
| 2 | 184 |
| 3 | 136 |
| 4 | 80 |

The preceding values correspond to the rotational rate or scale factor of one revolution per meter of distance covered.

In order to realize one pulse per 100 meters of distance covered, for each of the distance units of the individual fare rates 1 through 4, at the output $a_6$ of the circuit 25 for advancing the counters 8 and 9, the counting capacity of the circuit 25 must be reduced to the following values:

| Fare rate: | Pulses |
|---|---|
| 1 | 66.6=67 |
| 2 | 86.95=87 |
| 3 | 117.64=118 |
| 4 | 200 |

The preceding values are obtained from the following computations:

$$\left(\frac{160 \text{ pulses/m.} \times 100 \text{ m./pulses}}{1 \times 240 \text{ pulses}} = \frac{160 \times 100}{240} = 66.6\right)$$

$$\left(\frac{160 \times 100}{184} = 86.95\right) \quad \left(\frac{160 \times 100}{136} = 117.64\right)$$

$$\left(\frac{160 \times 100}{80} = 200\right)$$

The counting capacity of the frequency dividing circuit 16 is therefore reduced to 100 ($160 \times 150/240 = 100$). The setting on the counting capacities of the circuits 16, 24 and 25 is achieved through the feedback lines $r_1$ and $r_3$ through $r_{10}$, and by closing the corresponding bridges $b$. Although the counting capacity of the two circuits 24 and 25 varies with the fare rates that are in use, the counting capacity of the circuit 16 remains constant and independent of the changing over to another fare rate. At the frequency dividing circuit 24, the following bridges are closed for the individual fare rates 1 through 4:

Fare rate 1—$b18/1$
Fare rate 2—$b17/2$ and $b20/2$
Fare rate 3—$b17/3$, $b18/3$, $b19/3$ and $b20/3$
Fare rate 4—$b18/4$, $b19/4$, and $b21/4$.

correspondingly, for the frequency dividing circuit 25:

Fare rate 1—$b22/1$, $b24/1$, $b25/1$, $b26/1$, $b27/1$ and $b29/1$
Fare rate 2—$b22/2$, $b25/2$, $b27/2$, and $b29/2$.
Fare rate 3—$b23/3$, $b25/3$, $b29/3$
Fare rate 4—$b25/4$, $b26/4$ and $b27/4$.

Since the counter 9 must also be operated when the taxi meter is not in the mode corresponding to the "occupied" state, the distance pulse generator in the form of magnetic drum 26, reading head 27, amplifier 28, and pulse shaper 29, as well as the circuits 24 and 25, must always be operative.

Accordingly, the individual flip-flop circuits of these two frequency dividers 24 and 25, must not be provided with resetting terminals, as in the case of the circuits 16 and 20. When the taxi meter is made operative, the capacities of the previously selected fare rate, are set at the two circuits 24 and 25. This may lead to small measuring errors when changing over to another fare rate system. This is because, after the changing-over, the counting cycle that has just begun with the capacity of the preceding fare rate, must first be terminated before the output resulting therefrom can set up the new counting capacity. These errors of registration, however, are unavoidable in taxi meters which are in use. At the same time, these errors are so small that they are negligible.

In actual practice, these switches S1, S2, S3 and S4 are assembled in a double-switch having six positions; the first four positions are assigned to the fare rates 1, 2, 3 and 4, and the last two positions are assigned to the modes "stopped" and "not occupied." The purpose of the double switch is, as already indicated, to switch, at the same time, one feedback line of the circuit 24 to the output line $a_5$, and one feedback line of the circuit 25 to the output line $a_6$. The switches S1 through S4 are also actuated by the shaft 10 secured to the switching or control knob 11. The switch 13 may be omitted in this particular case.

Since the circuits 16 and 20 are connected in series with the two circuits 24 and 25, via the transition circuit, the preceding double switch having six positions, must also be provided with the pole 17. The purpose of this is to effect the presetting of the individual flip-flop stages of the circuits 16 and 20, before the beginning of each new registration. When switching the taxi meter to fare rate 1, by closing the two contacts of the switch S1, the feedback line $r_3$ is connected to the output line $a_5$, and the feedback line $r_7$ is connected to the output line $a_6$ of the circuits 24 and 25, respectively. At the same time, the timing pulse generator in the form of the master clock Z is switched into the circuit. When the vehicle begins to move immediately after the taxi meter has been made operative, the first counting cycle of the circuit 24 is terminated after the elapse of no more than 1.5 meters. This is because the capacity of the circuit 24 amounts to 240 pulses, even when fare rate 1 was switched in before, and 160 pulses are supplied by the magnetic drum 26 which rotates 360 degrees per meter of distance traveled. However, in the event that a higher fare rate was switched in at the end of the preceding trip of the vehicle, the first output pulse will leave the circuit 24 at an earlier stage, e.g., if fare rate 3 was switched in, then after 136 pulses —0.85 meter of distance.

After the first output pulse of the circuit 24 has reached the output lines $a_5$, via the switch S1 and the bridge $b_{18/1}$ and the stage F18, a counting capacity for all of the following counting cycles of the circuit 24, is set to 240 pulses. After another distance of 1.5 meters, therefore, the next pulse will already appear on line $a_5$ of the circuit 24. This applies similarly to the frequency dividing circuit 25.

The output pulses of the circuit 25, on the line $a_6$, are applied to the solenoid 5. At the same time, these pulses are applied to the closed switch S1 and the closed bridges $b_{22/1}$, $b_{24/1}$, $b_{25/1}$, $b_{26/1}$, $b_{27/1}$, and $b_{29/1}$. From there the pulses are transmitted to the corresponding flip-flop stages, so that the counting capacity of the circuit 25 is set to 67, after the first counting cycle.

The output pulses of the circuit 24 are applied to the transition circuit, by way of the line $a_5$. These pulses are then transmitted to the frequency divider 16, via the output line $a$, in a similar manner described for the embodiment of FIG. 3. In this case, the circuit 16 as well as the circuit 20 perform the same functions as in the first embodiment described supra.

Since the counting capacity of the circuit 16 amounts to 100 pulses after the basic amount has been compensated, one switching pulse will be applied to the solenoid 22 after every 150 meters of distance traveled.

The fare register 23 will thus be advanced each corresponding time by one fare increment. The preceding value of 150 meters is derived from the computation 240×100/160=150, where 240 is the counting capacity of the circuit 24, 160 is the number of pulses per meter of distance traveled, and 100 is the capacity of the circuit 16.

The timing pulse generator or master clock Z is, as already indicated, preferably in the form of an astable multivibrator which is a pulse emitting circuit well known in the art and has the capability of selectable pulse repitition frequency. This unit must be variable with regard to its pulse frequency for two reasons: the "occupied" time unit may be changed, on one hand, and, as shown in the two examples, the counting capacity of the circuit 16 may also change, on the other hand.

If the "occupied" time unit of one minute is maintained, as in the first embodiment, the timing pulse generator in the embodiment of FIG. 4 need supply only 100 pulses per minute rather than 126 pulses per minute. This is because the 100th time pulse must be an output pulse at the circuit 16 each time. Accordingly, one minute of "occupied" time corresponds to a distance unit of 150 meters, regardless of the fare which was switched in.

Adjustment of the timing pulse generator Z from one frequency to another frequency can be accomplished in a simple manner, for example, in the case of an astable multivibrator through the application of a potentiometer. With regard to the diodes $D_5$ and $D_6$, it is preferable for maintenance reasons, to mount them all in a fixed manner as described in relation to diodes $D_3$ and $D_4$ (see FIG. 3). In a one fare rate taxi meter, only the diodes of the feedback lines $r_3$ and $r_7$ will, of course, be installed, in order to save on the number of diodes. The diodes $D_3$ and $D_4$ must, however, be installed in any case.

The invention in accordance with the disclosed design, has particular advantages. Thus, all mechanical gears which are especially susceptible to wear and tear, are eliminated. The changing-over to other fare rates can be realized in a simple manner, by opening and closing bridges, without requiring the interchanging of any parts. In view of the fact that the electronic components are inherently of small dimensions, it is possible to accommodate the required parts within a relatively small amount of space. Furthermore, since almost no mechanical wear and tear can prevail, the taxi meter can experience a considerably longer operating life. The maintenance of the taxi meter, moreover, in accordance with the present invention, is reduced to a minimum.

It will be understood that each of the elements described above, or two or more together, may also find a useful application in other types of taxi meters differing from the types described above.

While the invention has been illustrated and described as embodied in taxi meters, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

We claim:

1. A taxi meter comprising, in combination, means for generating a first pulse train having a constant pulse repetition frequency; means for generating a second pulse train having a pulse repetition frequency dependent upon the speed of the vehicle containing said taxi meter; a fare register; an electronic transition circuit responsive to both said pulse trains and detecting the pulse train having the higher frequency; and frequency dividing means connected to said electronic transition circuit and actuated by the pulse train having the higher frequency selected by said transition circuit, said frequency dividing means actuating said fare register with a pulse train having a frequency lower than and proportional to said pulse train of higher frequency transmitted by said transmission circuit.

2. The taxi meter as defined in claim 1 including a second frequency dividing means connected between said fare register and said first frequency dividing means.

3. The taxi meter as defined in claim 1 including amplifying means connected between said frequency dividing means and said fare register.

4. The taxi meter as defined in claim 1 wherein said electronic transition circuit comprises a flip-flop adapted to receiving said first and second pulse trains; a gate having one input connected to one side of said flip-flop and having a second input connected to one of said pulse train generating means; a first diode connected to one of said pulse train generating means and to the output of said transition circuit; and a second diode connected to the output of said gate and to the output of said transition circuit.

5. The taxi meter as defined in claim 4 including a series circuit of an amplifying means and a second frequency dividing means connected between said first frequency dividing means and said fare register.

6. The taxi meter as defined in claim 1 wherein said frequency dividing means comprises a plurality of flip-flop stages interconnected to form a counting means and having means whereby the capacity of said counting means may be varied.

7. The taxi meter as defined in claim 6 including a first presetting means for presetting momentarily said counting means to a predetermined value; and second presetting means for setting said counting means to a constant predetermined value through feedback of the output pulses of said individual flip-flop stages.

8. The taxi meter as defined in claim 7 wherein said first presetting means is a potential representing the basic amount corresponding to the initial distance and time fare.

9. The taxi meter as defined in claim 2 wherein said second frequency dividing means comprises a plurality of flip-flop stages interconnected to form a counting means the capacity of which is presettable.

10. The taxi meter as defined in claim 9 including a third presetting means for momentarily setting to a predetermined value the initial state of said counting means; and fourth presetting means for setting to a constant predetermined value said counting means through feedback of the output pulses of the individual flip-flop stages.

11. The taxi meter as defined in claim 5 including a second gate having one input connected to the output of said first frequency dividing means and having another input connected to the output of said second frequency dividing means and providing a gated output for actuating said fare register.

12. The taxi meter as defined in claim 11 including an AND gate having one input connected to the output of said second gate and having another input connected to the output of said second frequency dividing means for providing double fare rate calculations.

13. The taxi meter as defined in claim 7 wherein said second presetting means comprises soldered terminals which may be bridged to form the desired feedback circuits.

14. The taxi meter as defined in claim 1 wherein said means for generating said first pulse train comprises an astable multi-vibrator.

15. The taxi meter as defined in claim 1 wherein said means for generating said second pulse train comprises photoelectric means driven by said vehicle.

16. The taxi meter as defined in claim 1 wherein said means for generating said second pulse train comprises a magneto-electric pulse generator driven by said vehicle.

17. The taxi meter as defined in claim 1 including scale factor changing means for varying the scale factor of pulses per unit of distance traveled.

18. The taxi meter as defined in claim 1 wherein said means for generating said second pulse train comprises a magnetic drum driven as a function of the distance traveled and having magnetically stored bits read out by a reading head and transferred as pulses for computing the fare.

19. The taxi meter as defined in claim 11 including switching means for presetting said frequency dividing means to predetermined values.

References Cited

UNITED STATES PATENTS 3,157,352   11/1964   Caywood ------------ 235—30

STEPHEN J. TOMSKY, Primary Examiner.

UNITED STATES PATENT OFFICE
CERTIFICATE OF CORRECTION

Patent No. 3,388,859                          June 18, 1968

Heinz Kelch et al.

It is certified that error appears in the above identified patent and that said Letters Patent are hereby corrected as shown below:

In the heading to the printed specification, lines 3 to 5, "Heinz Kelch, Dattenbergstrasse 30, and Siegfried Spauszus, Gorlitzerstrasse 10, both of Villingen, Black Forest, Germany" should read -- Heinz Kelch and Siegfried Spauszus, both of Villingen, Black Forest, Germany, assignors to Kienzle Apparate G.M.B.H., Villingen, Black Forest Germany --.

Signed and sealed this 16th day of March 1971.

(SEAL)
Attest:

Edward M. Fletcher, Jr.                      WILLIAM E. SCHUYLER, JR.
Attesting Officer                              Commissioner of Patents